United States Patent Office 3,752,863
Patented Aug. 14, 1973

3,752,863
METHOD FOR THE PRODUCTION OF ISOPRENE
Kazuo Okada, Takeo Wada, and Itsuo Furuoya, Osaka, Japan, assignors to Takeda Chemical Industries, Ltd., Osaka, Japan
No Drawing. Filed July 14, 1971, Ser. No. 162,631
Claims priority, application Japan, July 16, 1970, 45/62,348
Int. Cl. C07c 1/00
U.S. Cl. 260—681   7 Claims

ABSTRACT OF THE DISCLOSURE

The present invention relates to a method for producing isoprene by reacting isobutylene with formaldehyde in the vapor phase in the presence of a catalyst comprising silicon dioxide and a bismuth component such as $Bi_2O_3$. The catalyst may further contain minor amounts of at least one element such as Al, B, W, Fe, Ti, Zr and V.

---

The present invention relates to a method for the production of isoprene. More specifically, the invention relates to a method for the production of isoprene, which is characterized by reacting isobutylene with formaldehyde in the vapor phase in the presence of a solid catalyst comprising silicon dioxide and bismuth component.

To meet the increasing demand for isoprene as a starting material for the production of synthetic rubbers and the like, it is desired to simplify the manufacture of isoprene so that it can be produced easily in high purity as well as in good yield. For this purpose, the direct production (one stage process) through the condensation between isobutylene and formaldehyde has been recommended on account of its simplified precodures, and there have been reported several catalysts including alumina, silica-alumina, cadmium phosphate, phosphoric acid-chromium oxides (or hydroxides), phosphoric acid-manganese oxides (or hydroxides) or the like as the catalyst for the one stage process.

However these hitherto known catalysts have the following serious drawbacks;

(1) they are poor in the conversion ratio of formaldehyde (i.e. the ratio of the amount of reacted formaldehyde relative to that of the supplied formaldehyde), and
(2) they are in selectivity of reacted formaldehyde to isoprene.

Especially, as those known catalysts are poisoned by carbon compounds which are inevitably produced in the condensation reaction, the conversion ratio of formaldehyde rapidly decreases with the lapse of reaction time. In other words, when the known catalysts are used, it is necessary to repeat the regeneration procedure of burning the catalysts to remove the said carbon compounds at very short intervals. Such frequent regeneration is not desirably from an industrial point of view.

Now the present inventors have unexpectedly found that a solid catalyst comprising silicon dioxide and a bismuth component overcomes the above-mentioned disadvantages. The present invention is based on these new findings.

Thus, the principal object of the present invention is to provide an industrially feasible method for the production of isoprene in high purity as well as in high yield with a catalyst composition having a prolonged life time.

Said object is realized by reacting isobutylene with formaldehyde in the presence of a solid catalyst comprising silicon dioxide and bismuth component.

The solid catalyst to be employed in the method of the present invention is prepared by combining a silicon component with a bismuth component and heating the resulting mixture.

The silicon component is exemplified by silicon oxide (e.g., silica xerogel, silica, hydrogel, silica sol, crystalline silica or the like); silicic acid salt (e.g. potassium silicate, sodium silicate or the like); silicon halide (e.g. silicon tetrachloride, silicon tetrafluoride or the like); silicic acid ester (e.g. tetraethyl ortho-silicate or the like); other compounds which are easily convertiable to silicon dioxide; clay minerals containing such compounds; or the like.

This bismuth component is exemplified by bismuth oxide (e.g. bismuth trioxide, bismuth pentoxide or the like); bismuth hydroxide (e.g. BiO(OH), $Bi(OH)_3$ or the like); bismuthic acid or its salt (e.g. ortho-bismuthic acid, sodium bismuthate, potassium bismuthate or the like); bismuth halide, ammonobismuth or its partial hydrolyzate (e.g. bismuth pentachloride, bismuth trichloride, bismuth ammonobromide, bismuth oxychloride or the like); bismuth salt of mineral acid or the corresponding basic bismuth salt (e.g. bismuth nitrate, bismuth sulfate, basic bismuth sulfate or the like); bismuth carbonate or basic bismuth carbonate; bismuthchalcogenide (e.g. bismuth sulfide, bismuth selenide, bismuth telluride or the like); organic bismuth compound (e.g. $CH_3BiCl_2$ or the like); bismuth salt of organic acid (e.g. bismuth pyrogallate or the like); bismuth alcoholates (e.g. $Bi(OC_2H_5)_3$ or the like); bismuth rhodanate and metallic bismuth, or the like.

Those two components are combined by admixing or reacting them with each other according to the per se known means, for example by, (1) admixing an aqueous solution of the silicon component with an aqueous solution of bismuth component,which leads to the gelation of the mixture of both components, (2) impregnating one component with an aqueous solution of the other component, (3) ion exchange means, (4) physical means by the use of a ball mill, a kneader and the like, (5) uniformly depositing by evaporation a bismuth compound on silicon dioxide, (6) admixing an organic bismuth compound with an organic silicon compound and hydrolyzing the resultant mixture. When a component other than silicon oxide is employed as a silicon component or alternatively when a component other than bismuth oxide is used as a bismuth component, it is recommended that the combined materials of the two components are followed by hydrolysis with an aqueous solution of mineral acid (e.g., hydrochloric acid, sulfuric acid or the like) and/or by heating in the presence of oxygen.

The amount of the bismuth component relative to the amount of silicon dioxide in the solid catalyst is variable over a wide range, however, it is usually from about 0.001:1 to about 1:1, preferably from about 0.01:1 to about 0.6:1, most advantageously from about 0.01:1 to about 0.1:1, in terms of the atomic ratio of bismuth to silicon.

The thus-combined components are then heated at a temperature ranging from about 40° C. to about 1,000° C., more advantageously from about 180° C. to about 800° C. The heating procedure is usually carried out in the presence of air, inert gases (e.g. nitrogen, carbon dioxide, etc.), oxygen, hydrogen, water steam or a mixture thereof. Preferably, the heating procedure is carried out in the presence of oxygen or an oxygen-containing gas. As the condensation reaction between isobutylene and formaldehyde is usually carried out at a temperature higher than about 180° C., it is not necessarily essential to effect the heating procedure prior to use in the reaction.

The thus-obtained solid catalyst comprises silicon dioxide and bismuth component. The bismuth component in the solid catalyst may exist in the form of elementary metal, ion, or bismuth-containing compounds such as an oxide, a hydroxide, or a transitional intermediate therebetween, but at least a part of the bismuth component exists in the form of its oxide, e.g. $Bi_2O_3$.

The solid catalyst to be employed in the method of the present invention may further comprise as the minor ingredient, one or more elements of Al, P, B, W and Fe to further improve the conversion ratio of formaldehyde and/or the selectivity of reacted formaldehyde to isoprene. Especially, the addition of aluminum is recommended also from the viewpoint of the active life of the solid catalyst.

The addition of the above-mentioned element or elements as the minor ingredient may be effected whether prior to the combination of the silicon component and the bismuth component or after the combination of the said two components. Those elements may be added to the catalyst in the form of, for example, the corresponding nitrates, oxides, halides, sulfates, organic acid (e.g. acetic acid or the like) salts, ammonium salts or other conventional compounds.

The amount of the said minor ingredient relative to silicon dioxide in the solid catalyst is practically from about 0.0001:1 to about 0.5:1, most advantageously from about 0.001:1 to about 0.2:1 in terms of the atomic ratio of the corresponding element or elements to silicon. The addition of the minor ingredient may be carried out according to such means as stated above.

At least a part of the respective elements of the minor ingredient in the solid catalyst exists in the form of the corresponding oxide, e.g., $Al_2O_3$, $P_2O_5$, $B_2O_3$, $WO_3$, $Fe_2O_3$.

The solid catalyst may further comprise, as the additional ingredient, one or more elements of Ti, Zr, V, Cr, Mo, Mn, Co, Ni, Cu, Ag, Cd, Mg, Ca, Tl, Sn, Pb, Rb, Cs, Sr, Ba, Nd, In and Te. The addition of these elements may be carried out in the manner stated above. The amount of the said additional ingredient relative to silicon dioxide in the solid catalyst is preferably from about 0.0001:1 to about 0.5:1, most preferably from about 0.0005:1 to about 0.1:1 in terms of the atomic ratio of the corresponding element or elements to silicon.

At least a part of the respective elements of the additional ingredient in the solid catalyst exists in the form of the corresponding oxide, e.g., $TiO_2$, $ZrO_2$, $V_2O_5$, $Cr_2O_3$, $MoO_3$, $MnO_2$, $Co_2O_3$, NiO, CuO, $Ag_2O$, CdO, MgO, CaO, $Tl_2O$, $SnO_2$, PbO, $Rb_2O$, $Cs_2O$, SrO, BaO, $Nd_2O_3$, $In_2O_3$, $TeO_2$.

The method of the present invention is effected by the condensation reaction between isobutylene and formaldehyde in vapor phase in the presence of the above mentioned catalyst.

The molar ratio of isobutylene to formaldehyde may be varied according to the reaction conditions, but an excess of isobutylene, e.g. more than 3 mols of isobutylene per a mol of formaldehyde is preferred.

These two raw materials are reacted with each other in vapor phase usually at a temperature higher than 180° C., preferably from about 250° C. to about 330° C.

The residence time of reactants including isobutylene and formaldehyde on the solid catalyst may also be variable in accordance with other reaction conditions, but it is preferred under a pressure from about 0.5 to 20 atm. to be in the range from about 0.1 to about 100 g. hour per mol of reactants. The reaction pressure may be an atmospheric pressure, a reduced pressure or an elevated pressure, but a slightly elevated pressure is effectively adopted for the purpose of high production of isoprene.

In effecting the method of the present invention, some materials which do not disturb the reaction may be added to the reaction system as the diluent of the raw materials. The inert gaseous materials are exemplified by water steam, methanol, nitrogen gas, air, carbon dioxide, a paraffin hydrocarbon (e.g. methane, ethane, propane or the like). Particularly, the presence of water steam is desired to prevent the catalyst from an abrupt degradation of activities, and to increase the selectivity of the reacted formaldehyde to isoprene.

When the activities of the solid catalyst has dropped after a long lapse of reaction time in view of the conversion and selectvity, the catalyst is regenerated by heating the catalyst in the presence of air, oxygen or water steam, and is applicable again to the condensation reaction.

The catalyst may take the form of a fixed bed, a fluidized bed, a moving bed or the like, however, the fixed bed in the swing system is most desirable.

The reaction product is either condensed or absorbed in a suitable solvent, and is recovered by per se known fractional distillation or other conventional procedures. Unreacted isobutylene and formaldehyde can be separated and recycled to the condensation reaction as the starting materials.

Thus isoprene is produced in high conversion ratio as well as in high selectivity, and the obtained isoprene has the supreme purity of more than 99%.

The following examples will serve to further illustrate the method of the present invention with no intention of limiting the scope of the present invention thereto.

In these examples, the conversion ratio as well as the selectivity to isoprene are shown in terms of mean value within the definite reaction time effected. Gram(s), kilogram(s), liter(s) and milliliter(s) are simply abbreviated as g., kg., l. and ml. repectively.

EXAMPLE 1

Sodium silicate (Japanese Industrial Standard Grade No. 3) is neutralized and gelled with sulfuric acid, washed with water to remove the sodium, followed by drying at 100° C. The silica xerogel thus obtained is crushed and sieved. 500 g. of the granules of 5 to 20 Tyler mesh size is added to 1.2 liters of 3 N-hydrochloric acid containing 106.5 g. of bismuth trichloride and 8.2 g. of aluminum trichloride. With occasional stirring, the mixture is allowed to stand at room temperature for 1 day. Then, the mixture is transferred to an evaporation dish, where it is evaporated to dryness on a water bath at 100° C. for 5 hours, water and hydrogen chloride gas being thus evaporated off. The dry residue is heated in an air current containing water vapor at 400° C. for 2 hours to give a solid catalyst.

15 parts by weight of thus-obtained solid catalyst is packed into a tube reactor. Isobutylene (50.49 parts by weight per hour) and formaldehyde gas evaporated from a 40 weight percent aqueous formaldehyde solution (9.65 parts by weight per hour) are fed into the reactor at 300° C., and the reaction is contined for 10 hours at atmospheric pressure. The objective isoprene is cooled and trapped in the liquid form, while unreacted formaldehyde and water vapor are separated by absorption in water. Isoprene of purity more than 99% is obtained by the fractional distillation of said trapped product.

The conversion of formaldehyde and selectivity to isoprene in the said reaction are shown in Table 1 below as mean values for every two hours.

TABLE 1

| | Lapse of time after the start of the reaction (hour) of— | | | | | Mean value for 10 hours |
|---|---|---|---|---|---|---|
| | 0-2 | 2-4 | 4-6 | 6-8 | 8-10 | |
| Conversion of formaldehyde (percent) | 93.2 | 95.8 | 90.2 | 88.8 | 86.9 | 90.98 |
| Selectivity to isoprene (percent) | 52.8 | 74.8 | 80.8 | 78.5 | 77.9 | 72.96 |

EXAMPLE 2

In 100 g. of sodium silicate (Japanese Industrial Standard Grade No. 3) is dispersed 5.00 g. of sodium bismuthate, and 1.02 g. of neodymium carbonate decahydrate is evenly suspended therein. This mixture is gelled by the addition of 200 ml. of 3 N-ortho-phosphoric acid, and then, the same 3 N-phosphoric acid is gradually added therein until carbon dioxide gas ceases to be evolved. The resulting gel is washed with water until no sodium ion is detected and dried at 100° C. for 12 hours. Then, under the passage of ammonia-containing air, it is heated at 350° C. for 2 hours to give a solid catalyst.

The reaction between isobutylene and formaldehyde is carried out for 10 hours under the same conditions as stated in Example 1 with the use of the above prepared solid catalyst, and the following data are obtained.

Conversion of formaldehyde: 85%
Selectivity to isoprene: 75%
Purity of isoprene produced: more than 99%

EXAMPLE 3

1 kg. of a commercially available silica xerogel (5 to 20 Tyler mesh size, sold under the trade name "B Type-Fuji Gel" by Fuji-Davison Chemical Ltd., Japan) is added to a solution of 48.5 g. of bismuth nitrate in 200 ml. of 6 N-nitric acid, and the mixture is evaporated to dryness on a water bath.

Separately, 4.23 g. of silver dihydrogen phosphate is added to about 200 ml. of water, followed by the addition of 30 ml. of 3 N-aqueous $NH_3$ solution to give a solution. In the said solution is added the dry residue described above and the resulting mixture is again evaporated to dryness in the same manner as above. With the introduction of air containing water vapor, the dry residue is gradually heated and, after the temperature has reached 500° C., it is heated at the same temperature for about 2 hours to give a solid catalyst.

The reaction between isobutylene and formaldehyde is carried out for 10 hours under the same conditions as stated in Example 1 with the use of the above prepared solid catalyst, and the following data are obtained.

Conversion of formaldehyde: 85%
Selectivity to isoprene: 71%
Purity to isoprene produced: more than 99%

EXAMPLE 4

500 ml. of 2-aqueous $NH_3$ solution is added to a solution of 128 g. of bismuth trichloride in 500 ml. of 2 N-hydrochloric acid to give precipitates of basic bismuth chloride, which are recovered by filtration. To the precipitates are added 500 g. of granular silica xerogel and 100 ml. of water. The mixture is kneaded in a ball mill for 12 hours. The resulting gel is dried crushed and sieved to 5 to 20 Tyler mesh size, followed by heating at 400° C. for 5 hours in an air current to give a solid catalyst.

The reaction between isobutylene and formaldehyde is carried out for 10 hours under the same conditions as stated in Example 1 with the use of the above prepared solid catalyst, and the following data are obtained.

Conversion of formaldehyde: 82%
Selectivity to isoprene: 77%
Purity of isoprene produced: more than 99%

EXAMPLE 5

1,000 ml. of 2 N-hydrochloric acid containing 256 g. of bismuth trichloride and 45 g. of ferric chloride is gradually added to 2,500 g. of a silica sol containing 20% (on weight basis) of $SiO_2$. While stirring, this mixture is adjusted to about pH 8 by the addition of 3 N-aqueous $NH_3$ solution whereby the gelation is completed. The gel is dried, crushed, sieved to 5-20 Tyler mesh size and heated at 500° C. in an air current containing water vapor for 2 hours to give a solid catalyst.

The reaction between isobutylene and formaldehyde is carried out for 10 hours under the same conditions as stated in Example 1 with the use of thus-obtained solid catalyst, and the following data are obtained.

Conversion of formaldehyde: 92%
Selectivity to isoprene: 72%
Purity of isoprene produced: more than 99%

EXAMPLE 6

To a solution of 112 g. of bismuth nitrate in 480 ml. of 6 N-nitric acid is gradually added, with constant stirring, 1 kg. of sodium silicate (Japanese Industrial Standard Grade No. 3) which has been diluted with 6 litres of water, whereby a sol is obtained. While adjusting to about pH 3, the sol is heated at 100° C. for 3 hours to give a jelly-like hydrogel. The hydrogel is cut with a knife into cubes of about 8 cm.$^3$ and washed with deionized water until no more sodium ion is detected. Then, the hydrogel is added in 5 litres of a 0.1 N-aqueous solution of silver nitrate and the mixture is kept standing at room temperature for 12 hours. The hydrogel which has thus been ion-exchanged for silver ion is drained from the solution, washed with water, dried and admixed with 32.5 g. of powdery yellow tungstic acid. The mixture is kneaded in a ball mill for 12 hours. Thus kneaded powder is added to 500 ml. of an aqueous solution containing 5.0 g. of orthoboric acid and the mixture is evaporated to dryness in an evaporation dish. To the resulting residue are added 50 ml. of a silica sol containing 20% (on weight basis) of $SiO_2$ and 1.5 l. of water. The mixture is dried at 100° C. for 10 hours, crushed and sieved to 5-20 Tyler mesh size. Under the passage of air containing water vapor, the granules are heated at 350° C. for 6 hours to give a solid catalyst.

The reaction between isobutylene and formaldehyde is carried out for 10 hours under the same conditions as stated in Example 1, and the following data are obtained.

Conversion of formaldehyde: 95%
Selectivity to isoprene: 75%
Purity of isoprene produced: more than 99%

EXAMPLE 7

To 1,500 ml. of 2 N-nitric acid are added 1,000 g. of a silica sol containing 20% (on weight basis) of $SiO_2$, 64.6 g. of bismuth nitrate, 5.0 g. of aluminum nitrate, 13.5 g. of ferric chloride and 2.3 g. of a 85% aqueous solution of ortho-phosphoric acid. The mixture is adjusted to about pH 8 by the gradual addition of 3 N-aqueous $NH_3$ solution under stirring, whereby the gelation is completed. The resulting gel is dried at 100° C. for 15 hours, crushed, sieved to 5-20 Tyler mesh size and heated at 400° C. in an air current containing water vapor for 3 hours to give a solid catalyst.

The reaction between isobutylene and formaldehyde is carried out for 10 hours under the same conditions as stated in Example 1 with the use of thus-obtained solid catalyst, and the following data are obtained.

Conversion of formaldehyde: 91%
Selectivity to isoprene: 76%
Purity of isoprene produced: more than 99%

What is claimed is:

1. In a method for producing isoprene by reacting isobutylene with formaldehyde in the vapor phase in contact with a solid catalyst, the improvement wherein the catalyst consists essentially of silicon dioxide and a bismuth compound.

2. A method as claimed in claim 1, wherein the amount of the bismuth compound relative to silicon dioxide in the solid catalyst is from about 0.001:1 to about 1:1 in terms of the atomic ratio of bismuth to silicon.

3. A method as claimed in claim 2, wherein the amount of the bismuth compound relative to silicon dioxide is from about 0.01:1 to about 0.6:1 in terms of the atomic ratio of bismuth to silicon.

4. A method as claimed in claim 1, wherein the solid catalyst further comprises, as the minor ingredient, at least an element selected from the group consisting of Al, P, B, W and Fe, the amount of said minor ingredient relative to silicon dioxide being from about 0.0001:1 to about 0.5:1 in terms of the atomic ratio of the corresponding element or elements to silicon.

5. A method as claimed in claim 4, wherein the minor ingredient comprises Al.

6. A method as claimed in claim 4, wherein the solid catalyst further comprises, as an additional ingredient, at least an element selected from the group consisting of Ti, Zr, V, Cr, Mo, Mn, Co, Ni, Cu, Ag, Cd, Mg, Ca, Tl, Sn, Pb, Rb, Cs, Sr, Ba, Nd, In and Te, the amount of said additional ingredient relative to silicon dioxide being from about 0.0001:1 to about 0.5:1 in terms of the atomic ratio of the corresponding element or elements to silicon.

7. A method according to claim 1 wherein the bismuth compound is bismuth oxide.

References Cited
UNITED STATES PATENTS

| | | | |
|---|---|---|---|
| 3,662,016 | 5/1972 | Furuoya et al. | 252—456 |
| 3,135,807 | 6/1964 | Grasselli et al. | 252—444 |
| 3,574,780 | 4/1971 | Watanabe et al. | 260—681 |
| 3,642,930 | 2/1972 | Grasselli et al. | 260—681 |

DELBERT E. GANTZ, Primary Examiner

V. O'KEEFE, Assistant Examiner

U.S. Cl. X.R.

252—456